No. 652,017. Patented June 19, 1900.
G. J. DAY.
OVEN THERMOMETER.
(Application filed Apr. 21, 1900.)
(No Model.)
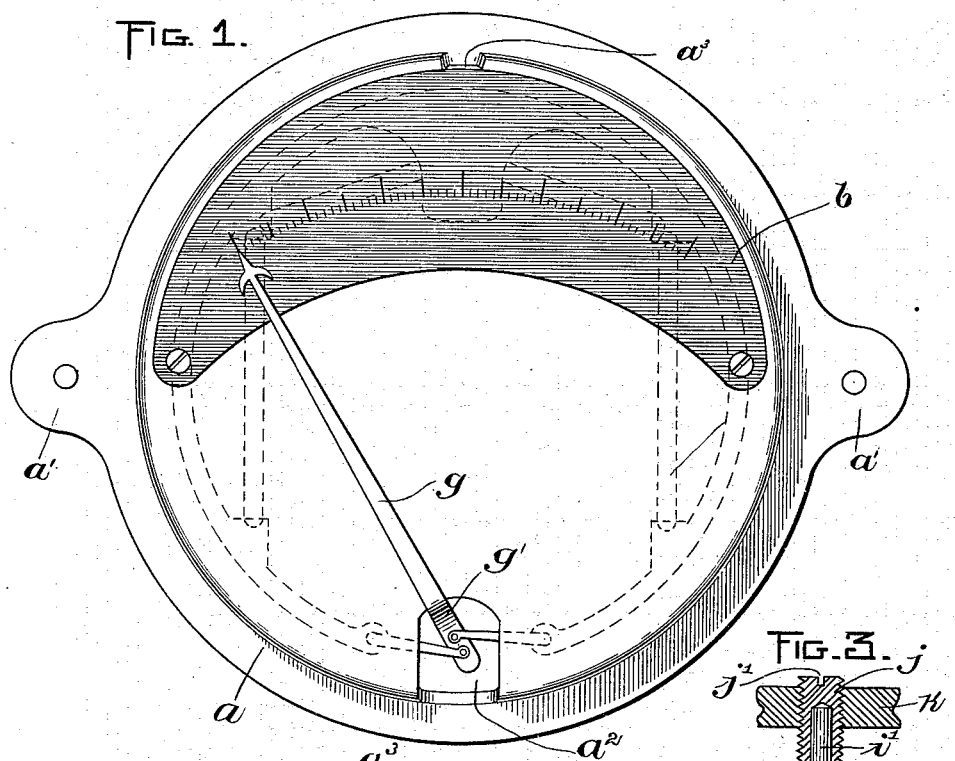
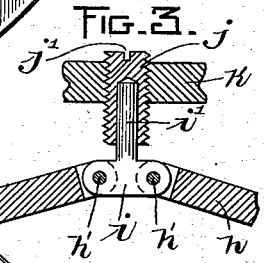
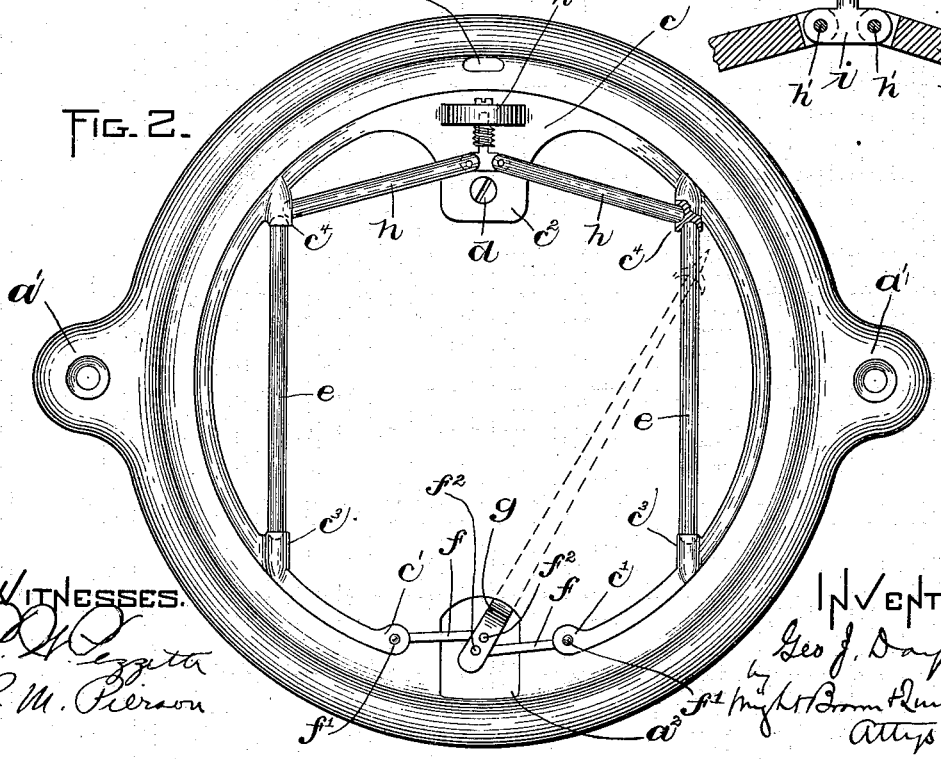
WITNESSES.
INVENTOR:
Geo. J. Day

UNITED STATES PATENT OFFICE.

GEORGE J. DAY, OF BOSTON, MASSACHUSETTS.

OVEN-THERMOMETER.

SPECIFICATION forming part of Letters Patent No. 652,017, dated June 19, 1900.

Application filed April 21, 1900. Serial No. 13,745. (No model.)

*To all whom it may concern:*

Be it known that I, GEORGE J. DAY, of Boston, in the county of Suffolk and State of Massachusetts, have invented certain new and useful Improvements in Oven-Thermometers, of which the following is a specification.

This invention has relation to oven-thermometers, and has for its object to provide certain improvements therein, which are illustrated upon the accompanying drawings, described in the following specification, and pointed out with particularity in the appended claims.

Referring to the said drawings, which illustrate one embodiment of the invention, Figure 1 represents in front view an oven-thermometer adapted to be attached to an oven-door. Fig. 2 represents a reverse view of the same. Fig. 3 represents in detail the adjusting mechanism.

On the said drawings, $a$ indicates a casing having apertured lugs $a'$ $a'$, by means of which it may be attached to the door of an oven. The casing $a$ is dish-shaped to provide an inner cavity for the reception of the ring and the expanding bars, and on the face of the casing is placed a scale-plate $b$, having a graduated scale thereon. The casing is apertured at $a^2$ for a purpose to be described, said aperture being located near the rim thereof, midway between the lugs $a'$.

$c$ indicates a cast-iron ring. This ring is not continuous, its ends $c'$ $c'$ being flattened and being separated, as shown in Fig. 2. The ends of the ring are connected by links or connecting-rods $f$ with an indicator or index $g$, the latter being bent, as at $g'$, so as to project through the aperture $a^2$ in the casing and permit its end to extend up to the scale on the plate $b$. The links are both of such relative length that at the normal temperature of the atmosphere the end of the indicator will be opposite the "zero mark" in the scale, and hence when the ring expands under the influence of heat the ends $c'$ of the ring will be separated and the indicator $g$ will be moved correspondingly along the scale, said index or indicator swinging about an axis midway between the pins $f^2$.

The construction which I have described may be varied considerably, since it does not form an essential feature of the invention, said invention relating more particularly to the mechanism, which I shall now proceed to describe, for separating the ends of the ring or drawing them together.

The ring is secured to the casing midway between its ends by a screw $d$, passing through a lug $c^2$, which projects radially inward from the ring and which practically divides the said ring into two separable sections. Each section of the ring is provided with socket-lugs $c^3$ $c^4$ for the reception of the expansion-bars $e$, by means of which the ends of the ring are caused to separate or approach each other. The expansion-bars are preferably formed of brass, brass composition, copper, or any other suitable metal capable of sufficient expansion under the temperatures prevailing in the oven. Within the ring are placed expansion-bars $e$ $e$ and $h$ $h$, which divide the cast-iron ring into four arcs. The bars $e$ $e$ are arranged in parallelism, and their lower ends are seated in the lug $c^3$. The upper ends of said bars are held against displacement by the lugs $c^4$. The bars $h$ $h$ have their outer ends held against displacement by lugs $c^4$, and they may be seated in said lugs or connected to the bars $e$ $e$ by pivots, as desired. Said bars $h$ $h$ form a toggle, the knuckle $i$ of which is provided with a pin $i'$, projecting into a socket in an adjusting-screw $j$, passed through a lug $k$, extending from the middle portion of the cast-iron ring. The screw $j$ has a slot $j'$, by means of which it may be turned, and it will be noted that the casing has an aperture $a^3$ to permit the insertion of a tool into the casing to engage the screw.

The bars $h$ $h$ not only operate to expand the cast-iron ring, but together with the screw $j$ and the pin $i$ serve to adjust the degree of separation of the ends $c'$ $c'$ of the ring to set the index $g$ at zero position at the temperature of the atmosphere.

The cast-iron ring $c$ by its inherent resiliency tends to assume a normal contracted position, and it does not expand readily at the normally-high temperature of an ordinary baking-oven; but the expansion-bars readily expand to a great degree under such temperature, and they tend to separate the ends of the ring in accordance with the increasing temperature, whereby the ends are gradually separated and the degree of separation is indicated upon the scale. When the expansion-bars contract as the oven cools, the resiliency of the cast-iron ring causes its ends to approach each other.

Having thus explained the nature of the invention and described a way of constructing and using the same, although without attempting to set forth all of the forms in which it may be made or all of the modes of its use, I declare that what I claim is—

1. An oven-thermometer comprising a casing, a ring in said casing having its ends separated, an indicator connected to the ends of said ring, expansion-bars having their ends connected to the opposite halves of the ring, and a toggle for adjusting the ends of the ring relatively to each other.

2. An oven-thermometer comprising a casing, a ring having separated ends and secured to said casing midway between its ends, an indicator connected to the said ends, and a toggle having its ends in engagement with the ring, and means for straightening said toggle.

3. An oven-thermometer comprising a casing, a ring having separated ends and secured to said casing midway between said ends to provide two separable sections, an expansion-bar carried by each section, a toggle connecting said sections, and an adjusting-screw connected to the knuckle of said toggle.

4. An oven-thermometer comprising a casing, a ring having separated ends and secured to said casing midway between said ends to provide two separable sections, an expansion-bar carried by each section, a toggle connecting said sections and having its knuckle provided with a pin, and a set-screw passed through a lug on said ring, midway between the ends thereof, and having a socket to receive the said pin, said casing being apertured to permit access to said adjusting-screw.

5. An oven-thermometer comprising a casing, a ring having separated ends, an indicator or index connected to the ends of the ring, and expansion-bars arranged to separate the ends of the ring when expanded by heat, said expansion-bars including a toggle for adjusting the ends of the ring relatively to each other independent of the expansion of said bars.

6. An oven-thermometer comprising a casing, a ring having separated ends and secured to said casing midway between its ends, an indicator connected to said ends, expansion-bars for separating the ends of the ring, said expansion-bars being arranged in the form of a toggle, and means for straightening said toggle.

In testimony whereof I have affixed my signature in presence of two witnesses.

GEORGE J. DAY.

Witnesses:
C. F. BROWN,
A. D. HARRISON.